United States Patent [19]

Suto et al.

[11] Patent Number: 5,426,647
[45] Date of Patent: Jun. 20, 1995

[54] DATA COMMUNICATION APPARATUS DETECTING INTERRUPT REQUESTS THROUGH DATA ERROR DETECTION

[75] Inventors: Naoki Suto; Tomoo Fukao; Naoharu Kido; Kazuyuki Tsukamoto; Minoru Yoshida; Ryuji Hosaka, all of Saitama, Japan

[73] Assignee: Fuji Xerox Co., Ltd., Tokyo, Japan

[21] Appl. No.: 327,448

[22] Filed: Oct. 21, 1994

Related U.S. Application Data

[63] Continuation of Ser. No. 141,581, Oct. 27, 1993, abandoned, which is a continuation of Ser. No. 771,099, Oct. 4, 1991, abandoned.

[30] Foreign Application Priority Data

Jan. 21, 1991 [JP] Japan .................................. 3-019119

[51] Int. Cl.$^6$ .............................................. G06F 11/00
[52] U.S. Cl. ...................................... 371/5.1; 371/5.5; 371/5.2
[58] Field of Search ................. 371/5.1, 62, 67.1, 68.2, 371/47.1, 5.5, 5.2

[56] References Cited

U.S. PATENT DOCUMENTS

| | | | |
|---|---|---|---|
| 4,234,953 | 11/1980 | Kline | 371/5.4 |
| 4,356,348 | 10/1982 | Smith | 179/81 R |
| 4,395,755 | 7/1983 | Wakai | 364/200 |
| 4,800,562 | 1/1989 | Hicks | 371/5.1 |

FOREIGN PATENT DOCUMENTS

| | | | |
|---|---|---|---|
| 52-47648 | 4/1977 | Japan | 371/5.5 |
| 0002415 | 6/1979 | Japan | 371/5.5 |

OTHER PUBLICATIONS

Distler et al., "Error Signature Test System", AT&T, Technical Digest, No. 77, Oct. 1985, pp. 19-20.

Primary Examiner—Hoa T. Nguyen
Attorney, Agent, or Firm—Finnegan, Henderson Farabow, Garrett & Dunner

[57] ABSTRACT

A facsimile apparatus receives data from a transmitting station and is provided with a capability for determining when an interrupt request signal has been received from another station. It is first judged whether an error has occurred in received image information on one line. If an error occurrence is detected, its time period is then measured. If the error period coincides with the output time period for a prescribed interrupt request signal, it is determined that an interrupt request signal has been received. Further, it may additionally be determined whether the coincidence has occurred a plurality of times in succession thereby affirming the reception of an interruption request signal.

4 Claims, 6 Drawing Sheets

DATA COMMUNICATION APPARATUS DETECTING INTERRUPT REQUESTS THROUGH DATA ERROR DETECTION

This application is a continuation of application Ser. No. 08/141,581, filed Oct. 27, 1993, now abandoned, which in turn is a continuation of application Ser. No. 07/771,099, filed Oct. 4, 1991, also abandoned.

BACKGROUND OF THE INVENTION

The present invention relates to a data communication apparatus and, more particularly, to a data communication apparatus, such as a facsimile apparatus, which is capable of detecting an interrupt request signal, e.g., a "catch phone" signal without the need for special hardware.

Among the services provided by NTT (Nippon Telegraph & Telephone Company) is a "catch phone" service. This service allows an interrupt call with a station B while the own station is communicating with another station A.

More specifically, when the own station is dialed by the station B while communicating with the station A, a prescribed call signal (interrupt request signal) is sent to the own station from an exchange. If a person at the own station manipulates the hook button in response to this call signal, the station B is connected to the own station, and a prescribed holding signal is sent out to the station A from the exchange. If the person at the own station manipulates the hook button again upon completion of the communication with the station B, the station A is again connected to the own station.

In the following description, the two stations (station A and own station) which are presently communicating with each other will be referred to as "transmitting station" and "receiving station", respectively, and a station B which tries to make interrupt communication will be referred to as "interrupt station".

The specifications of the call signal and the holding signal used in the catch phone service are as follows:
 Frequency: 400±10 Hz
 Output level: not more than −16 dBm
 Tone-on time: 70±10 ms
 Tone-off time: 70±10 ms
 Period: 4 or 8 sec (generally, 4 sec).
A waveform of these signals is shown in FIG. 7.

To receive the catch phone service in the case of a facsimile apparatus connected to a telephone circuit to communicate of image information, the facsimile apparatus may be provided with a means for detecting the call signal employed in the catch phone service, and circuits may be switched in response to the detection of the call signal.

This type of facsimile apparatus is disclosed, for example, in Japanese Patent Application Laid-Open No. Sho. 62-216584. The disclosed facsimile apparatus is constructed such that, when a call signal of the catch phone service is sent to a receiving station (or transmitting station), an interrupt station is connected to the receiving station upon reception of the call signal. A holding signal is sent out from an exchange to a transmitting station (or receiving station), which was interrupted in the midst of communication, as described above. However, since general facsimile apparatuses do not have a capability of detecting this holding signal, the transmitting station (or receiving station) is placed in a no-signal state, so that this station disconnects the circuit after the lapse of a predetermined time. Therefore, the facsimile apparatus of the above publication is designed such that the receiving station (or transmitting station) automatically dials the transmitting station (or receiving station) with which it previously communicated, upon completion of the interrupt communication.

Japanese Patent Application laid-Open No. Sho. 64-86660 discloses a technique in which a receiving station (or transmitting station) that is in communication with an interrupt station performs a restoring operation on a station previously communicated with, before a predetermined time has elapsed from the start of the interrupt communication. By virtue of this restoring operation, the station of the previous communication will not release the circuit even during the interrupt communication.

In either of the above-described cases, hardware, e.g., a filter, for separating the catch phone call signal from a communication signal, such as image information signal, is needed to detect the call signal. This makes the construction of the data communication apparatus complicated.

SUMMARY OF THE INVENTION

An object of the present invention is to provide a data communication apparatus which is capable of detecting a catch phone call signal without the need for special hardware.

A data communication apparatus according to the invention is characterized by performing the following judgments: whether an error has occurred in received data such as image information during its reception, and whether a detected period of error occurrence is coincident with the output period of the prescribed interrupt request signal. For example, the error is a decoding error as prescribed in CCITT, T5.

It is an additional feature of the invention that a judgement is made as to whether the above coincidence has been detected a predetermined number of times in succession.

When an interrupt request signal, e.g., a catch phone call signal, is superposed on data such as image information, an error occurs in the data because of a difference in frequency between the data and the interrupt request signal. Accordingly, if the period of the error occurrence detected as described above is the same as the output period of the interrupt request signal, it can be judged that an interrupt request signal has been received.

DESCRIPTION OF THE PREFERRED EMBODIMENTS

The present invention will be described below in detail with reference to the accompanying drawings, by way of embodiments in which the invention is applied to a facsimile apparatus.

Figure 2:
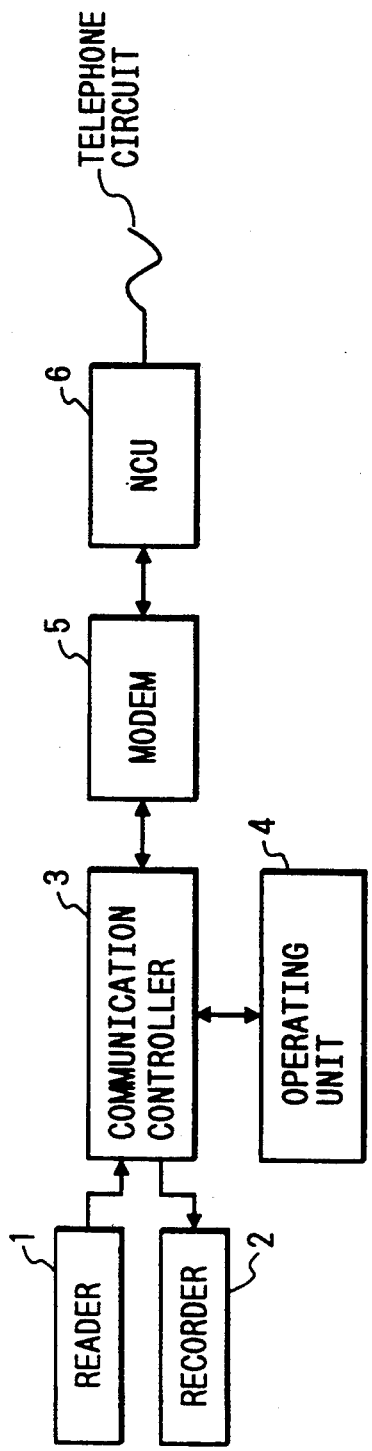
FIG. 2 is a block diagram showing the hardware construction of the apparatus of the first embodiment.
Figure 7:
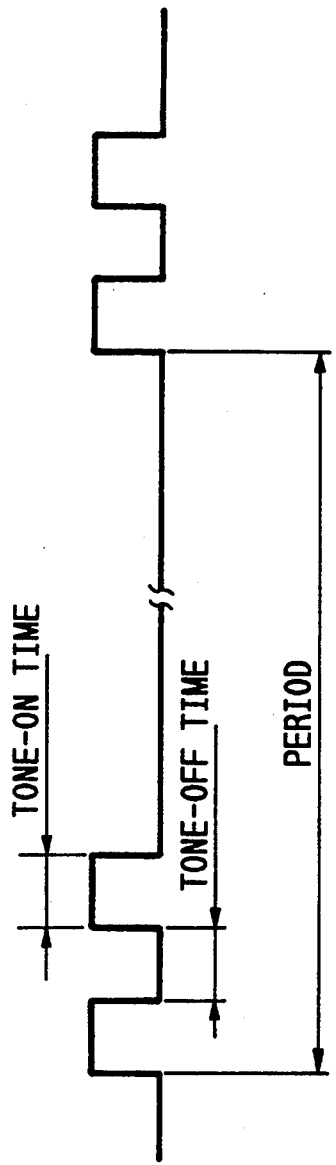
FIG. 7 shows a waveform of a call signal and a holding signal employed in the catch phone service.

FIG. 2 is a block diagram showing the hardware construction of a facsimile apparatus according to a first embodiment of the invention. In the figure, a reader 1 for reading an original document and a recorder 2 for outputting received image information are connected to a communication controller 3. Also connected to the communication controller 3 are an operating unit 4 consisting of various operating buttons used for operating the facsimile apparatus, a display for displaying the status, etc. of the facsimile apparatus, and a tone generator. The communication controller 3 is connected to a modem 5. The modem 5 is connected to a NCU 6, which is in turn connected to a telephone circuit.

Figure 3:
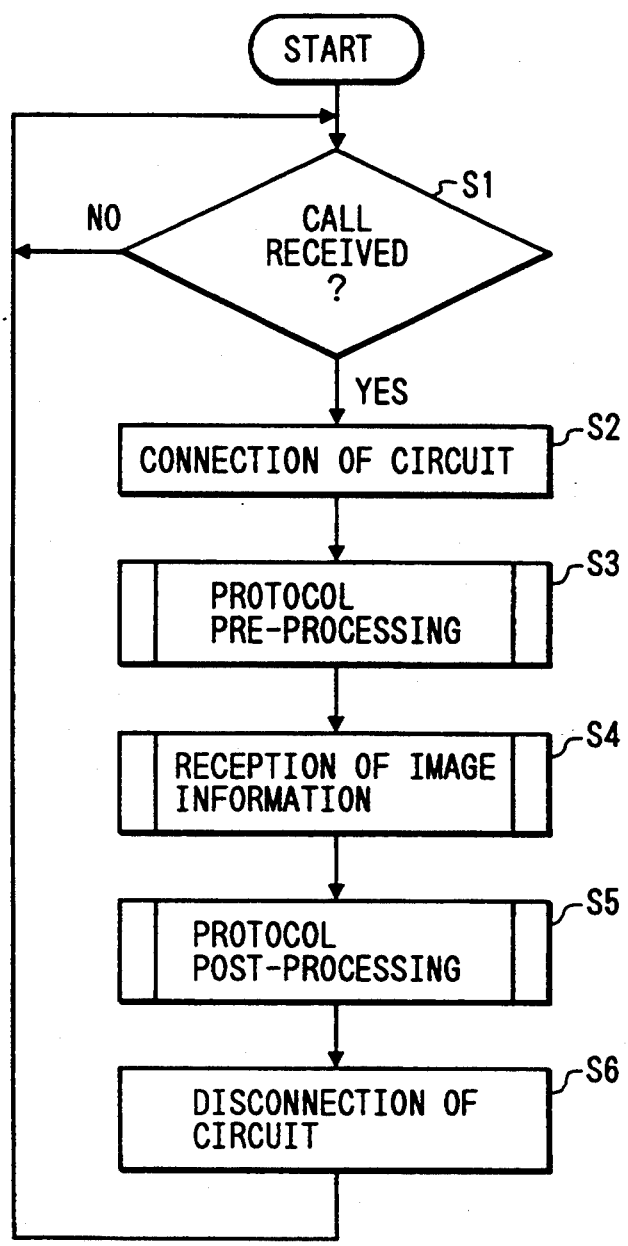
FIG. 3 is a flowchart showing a basic operation of a receiving station.
Figure 4:
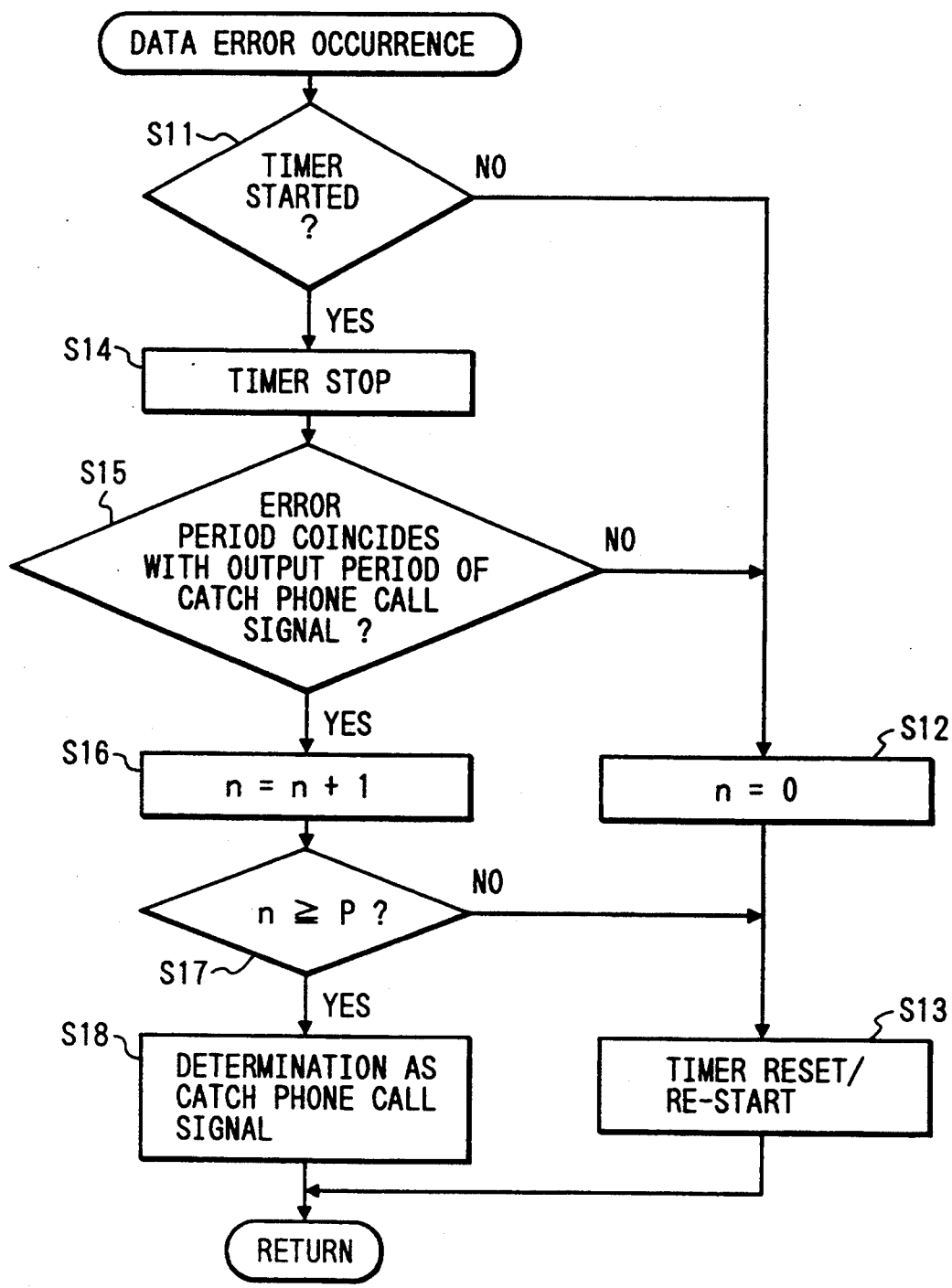
FIG. 4 is a flowchart showing an interrupt process performed by the apparatus of the first embodiment.

The communication controller 3, which has a microcomputer, executes various operations required for the facsimile apparatus and operations shown in FIGS. 3 and 4.

Various kinds of protocol signals and image information are sent out to the circuit via the communication controller 3, modem 5 and NCU 6, or input to the communication controller 3 from the circuit via the NCU 6 and modem 5.

The operation of the facsimile apparatus according to the first embodiment will be explained below. The features of the present invention resides in the construction of a receiving station that receives image information.

FIG. 3 is a flowchart showing a basic operation of a receiving station.

First, it is judged in Step S1 whether a call (ordinary call other than a catch phone call) has been received from a transmitting station. If the judgment is affirmative, the circuit is connected to the apparatus in Step S2, and a predetermined protocol pre-processing is executed in Step S3.

In Steps S4 and S5, reception of image information and a predetermined protocol post-processing are performed respectively. Thereafter, the circuit is disconnected in Step S6, and the process returns to Step S1. The received image information is printed out at a predetermined timing, although not illustrated in the figure.

FIG. 4 is a flowchart showing an interrupt process that is executed when it is detected that an error has occurred in image information of one line in Step S4 of FIG. 3. The image information error can be detected by use of known techniques, e.g., the ECM mode and parity check.

First, it is judged in Step S11 whether a catch phone call signal detecting timer (hereinafter referred to simply as "timer"), which will be described later in connection with Step S13, has been started. If the judgment is negative, a number n is reset to 0 in Step S12. Then, the timer is reset and re-started in Step S13 to initiate measurement of time from the detection of the data error. Thereafter, the process is terminated to return to a previous routine.

If it is judged in Step S11 that the timer has already been started, the timer is stopped in Step S14 to terminate the measurement of time. The time that has been detected by the timer is a period of the data error occurrence.

It is judged in Step S15 whether the detected period is the same as an output period of the prescribed catch phone call signal. If the judgment is negative, the process proceeds to Step S12.

If the judgment in Step S15 is affirmative, n is incremented in Step S16, and then it is judged in Step S17 whether n is equal to or larger than a threshold P, that is, it is judged whether it has been judged P or more times in succession that the data error period is the same as the output period of the catch phone call signal. If the condition $n \geq P$ is not satisfied, the process proceeds to Step S13. If $n \geq P$ is satisfied, it is judged in Step S18 that a catch phone call signal has been received. Thereafter, the process is terminated to return to a previous routine.

Figure 1:
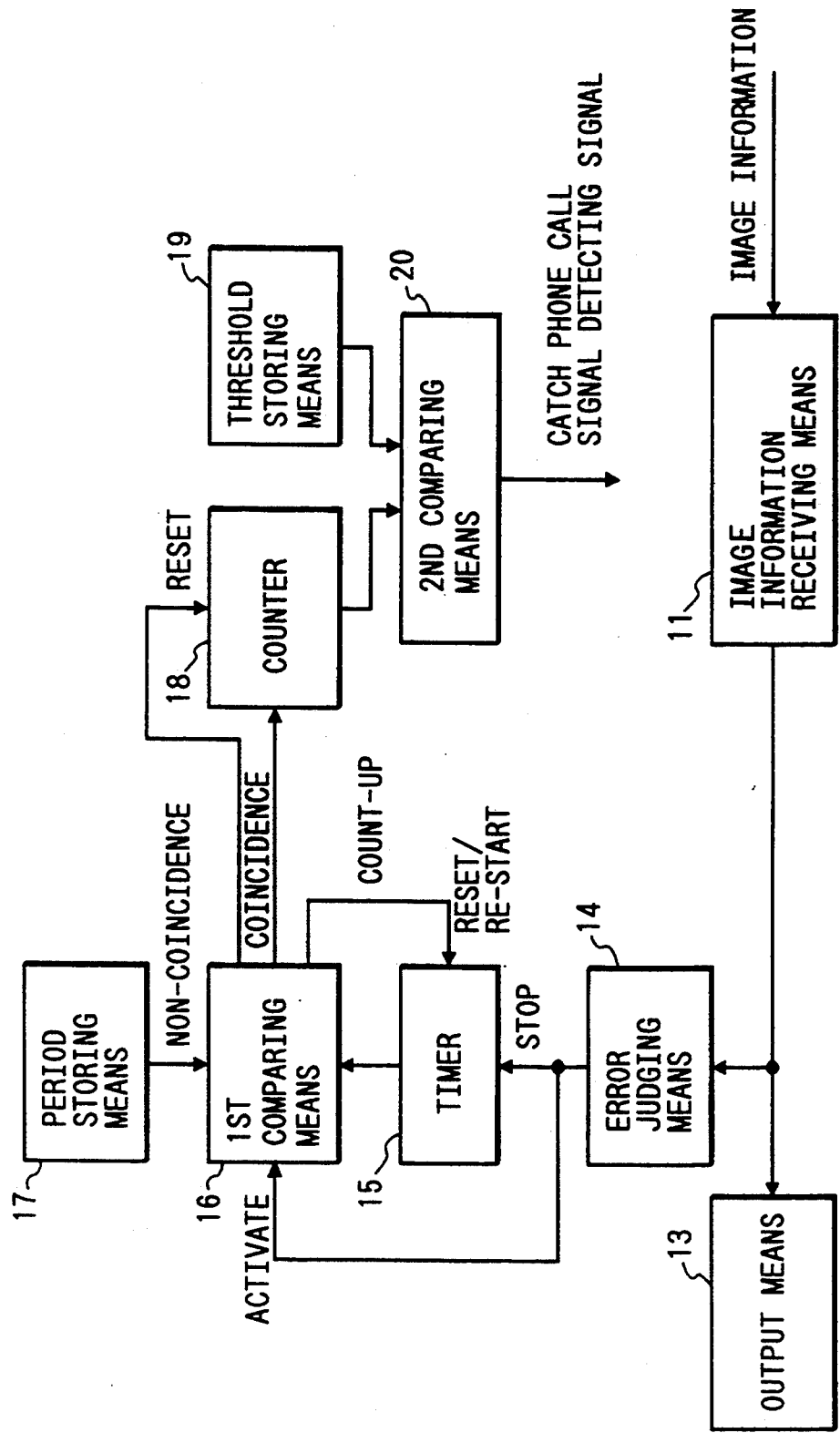
FIG. 1 is a functional block diagram of a facsimile apparatus according to a first embodiment of the present invention.

FIG. 1 is a functional block diagram of the facsimile apparatus according to the first embodiment.

In FIG. 1, image information transmitted from a transmitting station is received by an image information receiving means 11, and then provided to an output means 13.

An error judging means 14 judges whether or not an error has occurred in received image information of one line. If an error is detected, the error judging means 14 stops a timer 15, and activates a first comparing means 16.

When activated, the first comparing means 16 makes a comparison between an error period measured by the timer 15 and an output period of the prescribed catch phone call signal which is stored in a period storing means 17 in advance. If these two periods are coincident with each other, the first comparing means 16 causes a counter 18 to count up, whereas, if they are not coincident with each other, the first comparing means 16 resets the counter 18. After the comparison is made by the first comparing means 16, the timer 15 is reset and restarted.

When it is judged by a second storing means 20 that the count value of the counter 18 is coincident with a threshold P stored in a threshold storing means 19, the second comparing means 20 produces an output signal, which is to be a catch phone call signal detecting signal.

Figure 5:
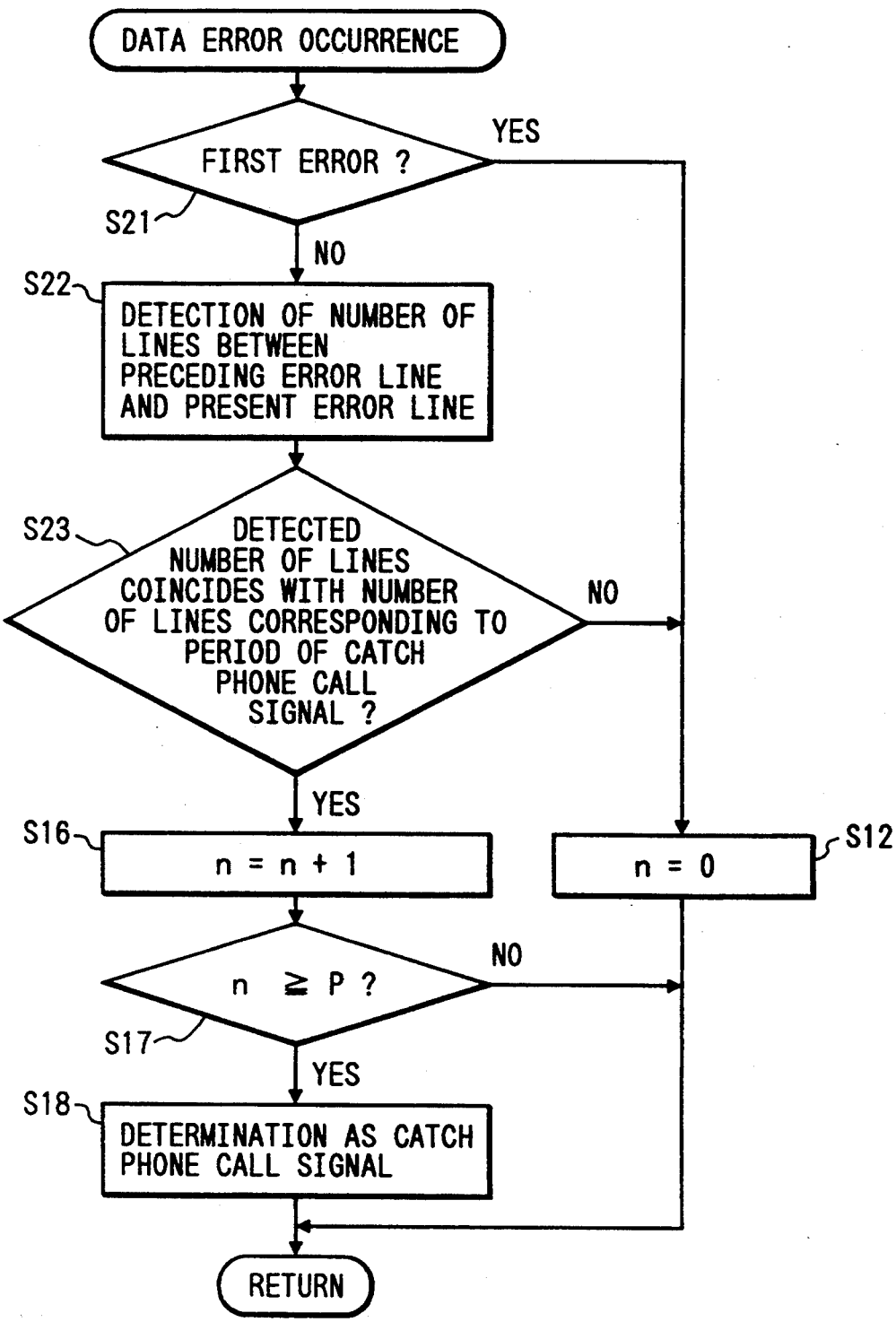
FIG. 5 is a flowchart showing an interrupt process performed by a facsimile apparatus according to a second embodiment of the invention.

FIG. 5 is a flowchart showing the operation of a facsimile apparatus according to a second embodiment of the invention. The flowchart shows an interrupt process that is executed when it is judged that an error has occurred in image information of one line during its reception in Step S4 of FIG. 3. In FIG. 5, the same reference numerals as those in FIG. 4 denote the same or equivalent processes.

The hardware construction of the second embodiment is the same as that of the first embodiment.

First, it is judged in Step S21 whether or not a detected error is a first one. If affirmative, a number n is reset to 0 in Step S12, and thereafter the process returns to a previous routine.

If it is judged that the detected error is not the first one, the number of lines existing between the preceding error line and the present error line is detected in Step S22. This number of lines is the information corresponding to the error period which is detected in Step S14 of FIG. 4.

It is judged in Step S23 whether the detected number of lines is coincident with the number of lines corresponding to the output period of the prescribed catch phone call signal. The number of lines corresponding to the output period of the catch phone call signal depends upon the communication speed. Accordingly, the number of lines that is selected in accordance with the communication speed employed is compared with the number of lines detected, as described above. If the coincidence is not detected in Step S23, the process proceeds to Step S12.

If the coincidence is detected, n is incremented in Step S16. It is then judged in Step S17 whether n is equal to or larger than a threshold P. If the condition $n \geq P$ is not satisfied, the process is terminated to return to a previous routine.

If $n \geq P$ is satisfied, it is judged in Step S18 that a catch phone call signal has been received. Thereafter, the process is terminated to return to a previous routine.

Figure 6:
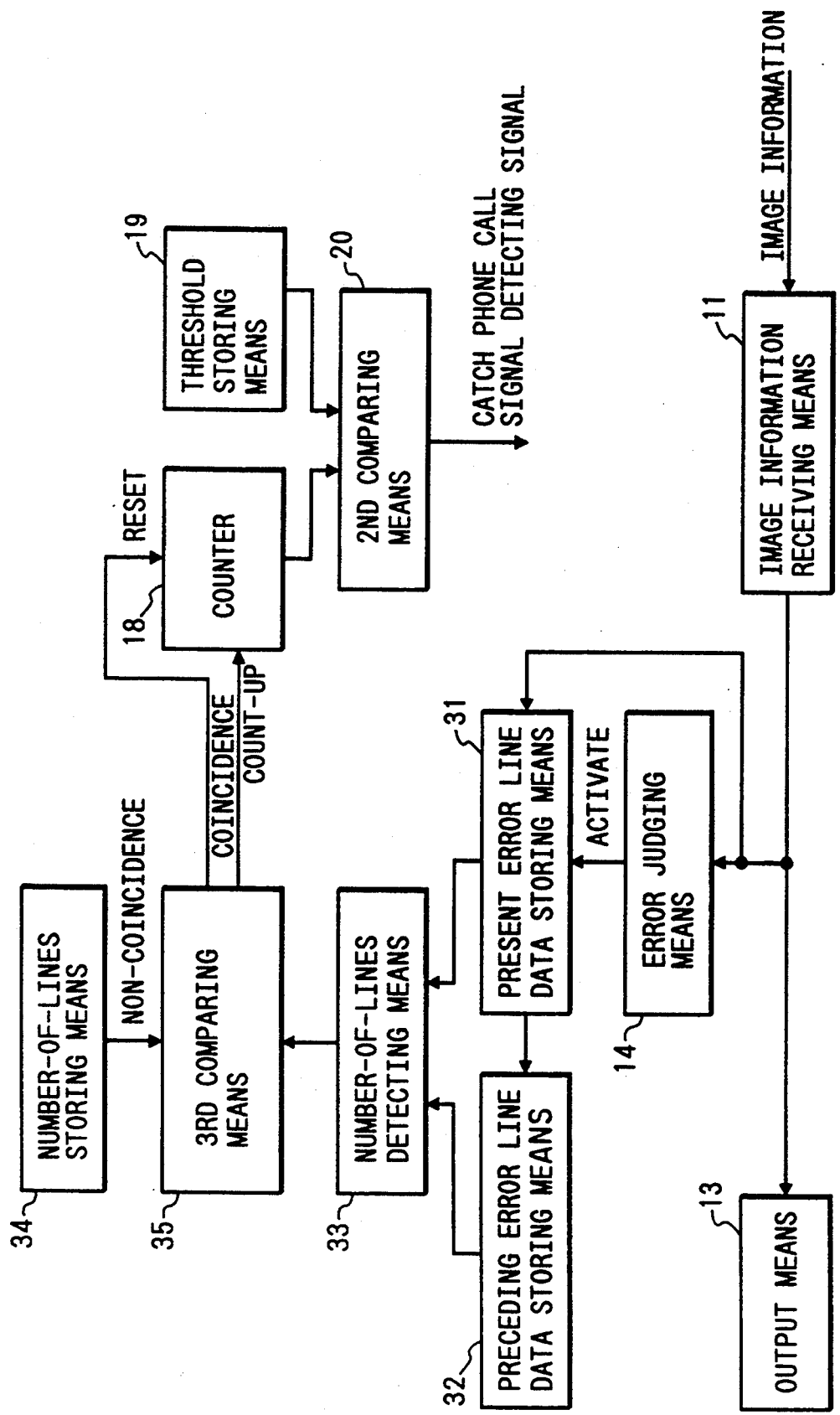
FIG. 6 is a functional block diagram of the apparatus of the second embodiment.

FIG. 6 is a functional block diagram of the facsimile apparatus of the second embodiment. In FIG. 6, the same reference numerals as those in FIG. 1 denote the same or equivalent parts, and descriptions therefor will be omitted.

In FIG. 6, when an error judging means 14 judges that an error has occurred in received image information of one line, a present error line data storing means 31 is activated to store information about the line in which the present error has occurred (e.g., a line number from the top of an original document).

If the error judging means 14 detects an error again, the information stored in the present error line data storing means 31 is transferred to a preceding error line data storing means 32, and information about the line in which the new error has occurred is stored in the present error line data storing means 31.

A number-of-lines detecting means 33 subtracts the previous error line number from the present error line number to detect the number of lines existing between the preceding error line and the present error line.

A third comparing means 35 makes a comparison between the number of lines detected in the number-of-lines detecting means 33 and the number of lines corresponding to the period of the prescribed catch phone call signal, which has previously been stored in a number-of-lines storing means 34. The number-of-lines storing means 34 stores a plurality of numbers of lines (corresponding to the respective periods of the catch phone call signal), which are selectively output in accordance with the communication speed employed on each particular occasion. If it is detected that the two numbers of lines are coincident with each other, the counter 18 is caused to count up, whereas, if the coincidence is not detected, the counter 18 is reset.

Although in the foregoing embodiments the present invention was described by way of one example in which interrupt communication is caused by the catch phone call signal, the present invention may be applied to other various types of interrupt communication. For example, the present invention may be applied to an interrupt communication system employed by AT & T, U.S.A. The call signal used in this system comprises two signals of 480 and 620 Hz, which are combined together, and is output at 60 IPM.

Although in the foregoing embodiments it is judged that a catch phone call signal has been received when the coincidence between the error period and the output period of the catch phone call signal is detected a plurality of times in succession, it is, of course, possible to do such a judgment when the coincidence is detected only once.

Further, if a plurality of different periods of interrupt request signals are prepared for the comparison with a time interval of an error occurrence, it is possible to detect both the catch phone call signal and an interrupt request signal other than the catch phone call signal.

Although in the foregoing description the present invention is applied to a facsimile apparatus that performs communication of image information, the present invention may be applied to any type of data communication apparatuses (e.g., a communication apparatus using a personal computer) as long as they are equipped with a modem and perform data communication by exchanging prescribed protocol signals. In such a case, data to be communicated is not limited to image information, as a matter of course.

According to the data communication apparatus of the invention, an interrupt request signal can be detected without the need for special hardware, so that the construction of the data communication apparatus is simplified. Further, since it is judged whether the coincidence between the error period and the output period of the interrupt request signal has been detected a plurality of times in succession, the accuracy of detecting the interrupt request signal is improved.

What is claimed is:

1. A data communication apparatus connected to a plurality of stations in a communication system, the data communication apparatus comprising:
    error detecting means for detecting successive data errors in a data signal which is received by the apparatus through a connection from a first station in the communication system;
    period determining means responding to the error detecting means for determining first information representing a time period between the successive data errors; and
    judging means for judging whether the first information for at least the time period between one set of successive data errors coincides with a second information representing a cyclic time period of a system interrupt request signal receivable by the apparatus through another connection from the communication system, and, if so, determining that said one set of successive data errors in said data signal indicates that an interrupt request signal has been output by another station in the communication system and received by the error detecting means in the apparatus.

2. The apparatus according to claim 1, wherein the apparatus is a facsimile apparatus, the received data represents successive lines of characters, and the error detecting means corresponds each detected error in data to a line of received data.

3. The apparatus according to claim 2, wherein the period determining means includes counting means for counting lines of the received data and the first information represents a first number of lines detected to exist between a preceding error line and a present error line, and the second information represents a second number of lines occurring over a time period substantially equal to the cyclic time period of the interrupt request signal.

4. The apparatus according to claim 1, wherein the judging means is operated repeatedly to make successive judgments for successive sets of detected data errors; and further comprises:
    counting means for counting affirmative judgments by the judging means over successive sets of detected data errors; and
    count value judging means for judging whether a count value of the counting means has reached a predetermined threshold, and, if so, the judging means determining that the data errors indicate that an interrupt request signal has been output by another station in the communication system and received by the apparatus.

* * * * *